Figure 1:
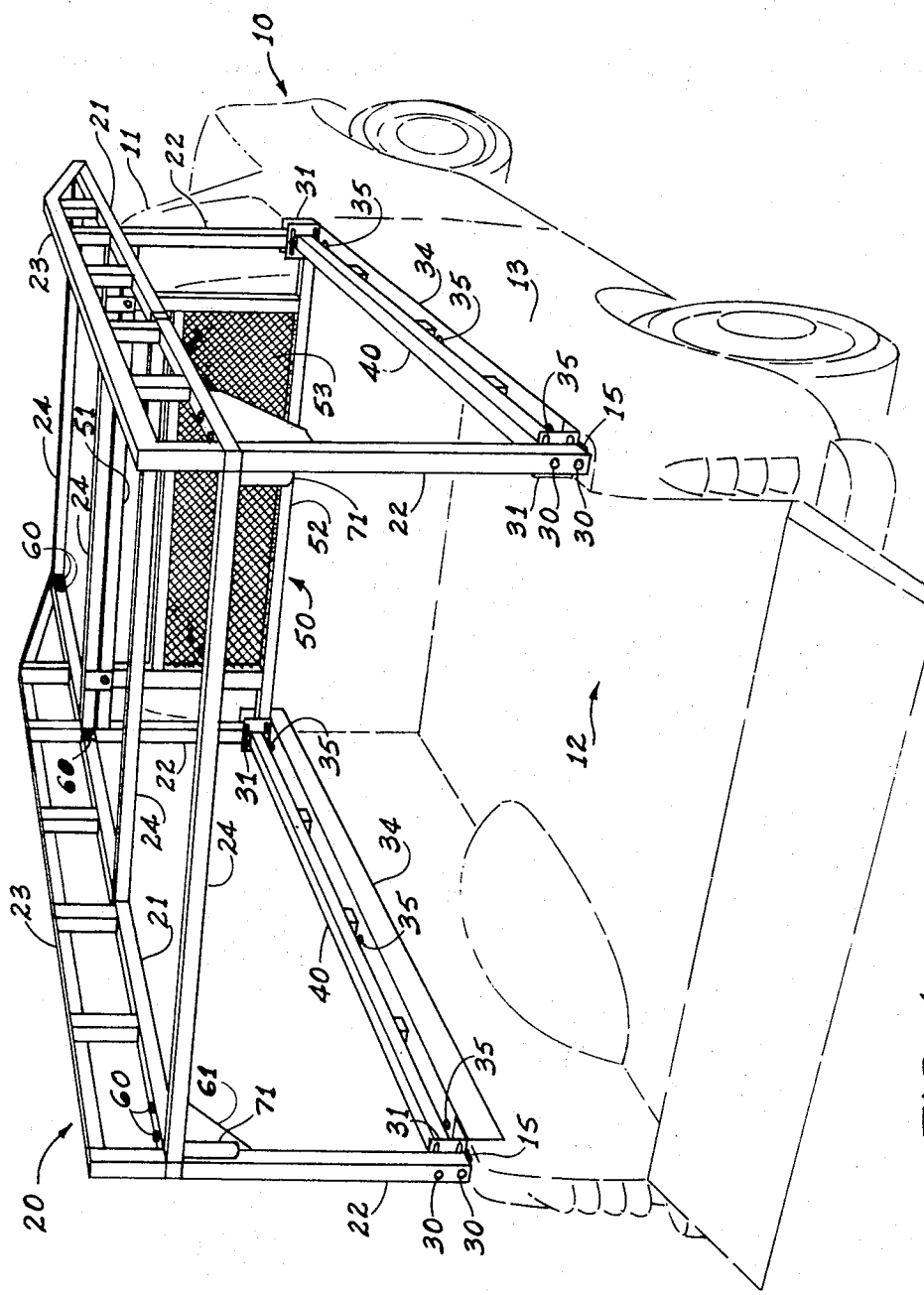

United States Patent [19]
Suitt

[11] 3,765,713
[45] Oct. 16, 1973

[54] CARRIER RACK FOR PICK UP TRUCKS

[76] Inventor: L. T. Suitt, P.O. Box 272, Granbury, Tex. 76402

[22] Filed: Mar. 30, 1972

[21] Appl. No.: 239,563

[52] U.S. Cl. .................................. 296/3, 224/29 R
[51] Int. Cl. ........................... B60p 3/40, B62d 33/02
[58] Field of Search ................... 224/29 R, 42.1 E, 224/42.43, 42.42 R, 42.45 R; 296/3, 10

[56] References Cited
UNITED STATES PATENTS

| 3,594,035 | 7/1971 | Ferguson | 224/29 R X |
| 2,947,566 | 8/1960 | Tower | 224/29 R X |

*Primary Examiner*—Gerald M. Forlenza
*Assistant Examiner*—Jerold M. Forsberg
*Attorney*—J. Bruce Synnott, Jr.

[57] ABSTRACT

A carrier rack, readily applicable to pick up trucks and removable therefrom, for use of electricians, plumbers, contractors, painters, and others who may need to haul material which is substantially longer than the bed of the truck. Consists of an elevated rack above the truck bed, and extending forwardly beyond it, over the cab of the truck, having supporting posts extending upwardly from the sides of the truck bed, at its corners. The supporting posts are connected at their lower ends, by belts extending transversely thereof, generally parallel to the longitudinal axis of the truck, to bracket having angle iron bases for overlying engagement with the upper edge portions of the sides of the truck bed, to which they are removably connected by other belts, and having upstanding planar portions in juxtaposed relation to one side of the posts, respectively, and extending transversely of the truck bed, and having elongated horizontal slots therein for engagement by the first mentioned belts, whereby the supporting posts are adjustable laterally relative to the sides of the truck bed.

5 Claims, 6 Drawing Figures

Patented Oct. 16, 1973

3,765,713

2 Sheets-Sheet 2

CARRIER RACK FOR PICK UP TRUCKS

This invention relates to a carrier rack for pick up trucks, and it concerns more particularly a carrier rack as hereinafter described, readily applicable to pick up trucks and removable therefrom, for use of electricians, plumbers, contractors, painters, and others who may need to haul material which is substantially longer than the bed of the truck.

The carrier rack of the invention is characterized by a rectangular open frame, shallow relative to its longitudinal and transverse dimensions, having supporting posts extending upwardly from the sides of the truck bed, at its corners, whereby the frame is supported above the truck bed and extends forwardly beyond the truck bed, over the cab of the truck, the frame having upstanding side members and having a plurality of cross braces connecting the side members along their lower edges and spaced longitudinally relative thereto.

The side members and the connecting cross braces together form an elevated rack above the truck bed, and extending forwardly beyond it, over the cab of the truck, adapted to support elongated material in horizontal position, substantially aligned with the longitudinal axis of the truck, or alternatively, the material may be supported in forwardly and upwardly inclined position, with one end resting on the bottom of the truck bed and the other end resting against one of the cross braces.

The structure above described is generally old. The lower ends of the supporting posts are usually received in the stake holes or pockets which are ordinarily provided in the sides of the truck bed, and a disadvantageous feature of such arrangements is that the spacing of the supporting posts must conform to the spacing of the stake holes or pockets in which they are received, which may vary.

A novel feature of this invention is that the supporting posts are connected to the sides of the truck bed independently of the stake holes or pockets, and are adjustable laterally relative to the sides of the truck bed, as hereinafter described, so that the carrier rack is suitable for universal application to any truck bed, the width of which may vary within limits.

According to the invention the supporting posts are connected at their lower ends, by belts which extend transversely thereof, to brackets having upstanding planar portions in juxtaposed relation to one side of the posts, respectively, and extending transversely of the truck bed, and having elongated horizontal slots therein for engagement by the bolts, whereby they are adjustable relative thereto, and the brackets having angle iron bases for overlying engagement with the upper edge portions of the sides of the truck bed, to which they are removably connected by other bolts, as hereinafter described.

In one form of the invention the angle iron bases of the brackets may be elongated, and may be substantially coextensive with the upper edge portions of the sides of the truck bed. The sides of the truck bed are usually right angular in transverse section, and may be turned inwardly or outwardly at their upper edges. The bolts connecting the brackets are passed through aligned openings therefor in the angle iron bases and the inwardly or outwardly turned upper edge portions of the sides of the truck bed.

Figure 2:
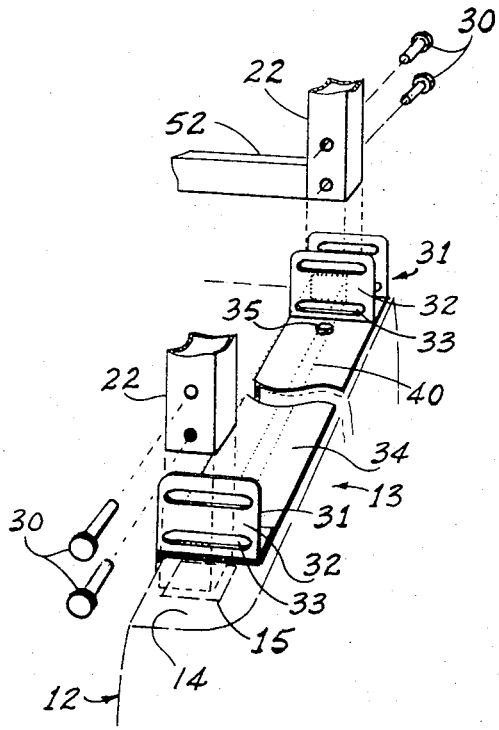
Figure 3:
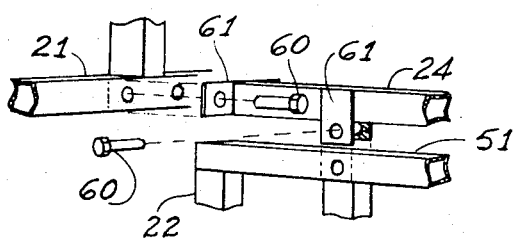
Figure 4:
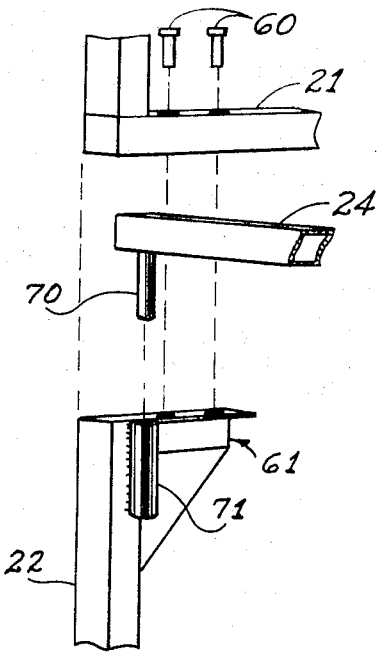
Figures 5, 6:
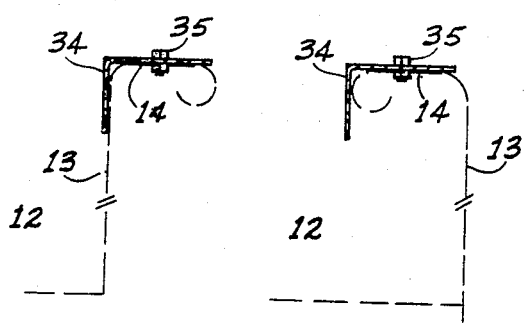

The invention will be readily understood by referring to the following description and the accompanying drawing, in which:

FIG. 1 is a perspective view showing a carrier rack embodying the invention as applied to a pick up truck, shown in broken lines;

FIGS. 2, 3, and 4 are fragmentary exploded perspective views on an enlarged scale showing details of construction; and FIGS. 5 and 6 are fragmentary sectional elevational views on an enlarged scale showing how the carrier rack of the invention is attached to the upper edge portions of the sides of the truck bed, which in different forms thereof may be turned outwardly as shown in FIG. 5 or inwardly as shown in FIG. 6.

Referring to the drawing, the numeral 10 designates generally a conventional pick up truck having a cab, indicated generally by the numeral 11, and a load carrying bed, indicated generally by the numeral 12. A carrier rack embodying the invention is designated generally by the numeral 20.

The sides of the truck bed 12, indicated by the numeral 13, are right angular in transverse section and may be turned inwardly or outwardly at their upper edges, as at 14, FIGS. 5 and 6. The top surfaces of the upper edge portions 14 are planar.

Stake holes or pockets 15 are provided in the upper edge portions 14 of the sides 13 of the truck bed 12 for engagement by upstanding frame portions of stake bodies and the like (not shown).

The carrier rack 20 is characterized by a rectangular open frame 21, which is shallow relative to its longitudinal and transverse dimensions, having supporting posts 22 extending upwardly from the sides 13 of the truck bed 12, at its corners, whereby the frame 21 is supported above the truck bed 12 and extends forwardly beyond the truck bed 12, over the cab 11 of the truck 10. The frame 21 has upstanding side members 23, which are of open construction, and has a plurality of cross braces 24 connecting the side members 23 along their lower edges and spaced longitudinally relative thereto.

The side members 23 and the cross braces 24 which comprise the frame 21 form an elevated rack above the truck bed 12, and extending forwardly beyond it, over the cab 11 of the truck 10, adapted to support elongated material in horizontal position, substantially aligned with the longitudinal axis of the truck 10, or alternatively, the material may be supported in forwardly and upwardly inclined position, with one end resting on the bottom of the truck bed 12 and the other end resting against one of the cross braces 24.

According to the invention the supporting posts 22 are connected at their lower ends, by bolts 30 which extend transversely thereof, generally parallel to the longitudinal axis of the truck 10, to brackets 31 having upstanding planar portions 32 in juxtaposed relation to one side of the posts 22, respectively, and extending transversely of the truck bed 12, and having elongated horizontal slots 33 therein for engagement by the bolts 30, whereby they are adjustable laterally relative thereto. The brackets 31 have angle iron bases 34 for overlying engagement with the upper edge portions 14 of the sides 13 of the truck bed 12, to which they are removably connected by other bolts 35, as hereinafter described.

As shown the angle iron bases 34 of the brackets 31 are elongated, and are substantially coextensive with the upper edge portions 14 of the sides 13 of the truck bed 12. The bolts 35 are passed through aligned openings therefor in the angle iron bases 34 and the inwardly turned upper edge portions 14 of the sides 13 of the truck bed 12.

A pair of upstanding side rails 40, which are of open construction and integral with the angle iron bases 34, and substantially coextensive with their lengths, are provided, between the supporting posts 22.

The front supporting posts 22 form portions of a vertically disposed rectangular open frame 50, having top and bottom members 51, 52, which extends transversely of the truck bed 12, between two pairs of the upstanding planar portions 32, and has a protective screen panel 53 thereon for overlying spaced apart relationship with the rear window of the cab 11. The top member 51 of the frame 50 is removably connected, by bolts 60 and suitable fittings 61, to one of the cross braces 24.

The side members 23, the cross braces 24, and the supporting posts 22 which comprise the carrier rack 20 may be removably connected to each other by bolts 60 and fittings 61, whereby they are separable, so that the rack 20 may be removed bodily from the bed 12 of the truck 10, leaving the side rails 40 and the protective screen panel 53 in place, or alternatively, one or more of the cross braces 24 may be removed while leaving the rack 20 in place, by selective disengagement of the bolts 30 and 60.

One of the cross braces 24, which is positioned rearwardly of the rack 20, is not connected by bolts corresponding to the bolts 60 but has downwardly extending pins 70 at its ends which are receivable in sockets 71 therefor on the supporting posts 22.

I claim:

1. In combination with a pick up truck having a cab and a load carrying bed rearwardly of the cab, the sides of the truck bed being right angular in transverse section and the top surfaces of the upper edge portions being planar, the combination of an elevated rack above the truck bed, and extending forwardly beyond it, over the cab of the truck, having supporting posts extending upwardly from the sides of the truck bed, at its corners, the supporting posts being connected at their lower ends, by bolts extending transversely thereof, generally parallel to the longitudinal axis of the truck, to brackets having angle iron bases for overlying engagement with the upper edge portions of the sides of the truck bed, to which they are removably connected by other bolts, and having upstanding planar portions in juxtaposed relation to one side of the posts, respectively, and extending transversely of the truck bed, and having elongated horizontal slots therein for engagement by the first mentioned bolts, whereby the supporting posts are adjustable laterally relative to the sides of the truck bed.

2. The structure of claim 1, the rack being characterized by a rectangular open frame, shallow relative to its longitudinal and transverse dimensions, having upstanding side members, of open construction, and having a plurality of cross braces connecting the side members along their lower edges and spaced longitudinally relative thereto, the side members, the cross braces, and the supporting posts which comprise the rack being removably connected to each other, whereby they are separable, so that the rack may be removed bodily from the truck bed, or alternatively, one or more of the cross braces may be removed while leaving the rack in place.

3. The structure of claim 2, at least some of the cross braces being connected to the side members by bolts, and one of the cross braces, rearwardly of the rack, having downwardly extending pins at its ends received in sockets therefor on the corresponding supporting posts.

4. The structure of claim 2, the angle iron bases of the brackets being elongated, and being substantially coextensive with the upper edge portions of the sides of the truck bed, and having a pair of upstanding side rails thereon, of open construction and integral with the angle iron bases, and substantially coextensive with their lengths, between the supporting posts.

5. The structure of claim 2, the front supporting posts forming portions of a vertically disposed rectangular open frame, having top and bottom members, extending transversely of the truck bed, between two pairs of the upstanding planar portions, and having a protective screen panel for overlying spaced apart relationship with the rear window of the cab, the top member of the frame being removably connected to one of the cross braces.

* * * * *